(12) United States Patent
Nouri et al.

(10) Patent No.: US 11,339,339 B1
(45) Date of Patent: May 24, 2022

(54) CONDENSATE STABILIZATION PROCESS

(71) Applicants: Mehdi Nouri, Houston, TX (US);
Eberhard Lucke, Houston, TX (US)

(72) Inventors: Mehdi Nouri, Houston, TX (US);
Eberhard Lucke, Houston, TX (US)

(*) Notice: Subject to any disclaimer, the term of this patent is extended or adjusted under 35 U.S.C. 154(b) by 142 days.

(21) Appl. No.: 17/024,456

(22) Filed: Sep. 17, 2020

(51) Int. Cl.
| | | |
|---|---|---|
| *C10L 3/00* | (2006.01) | |
| *C10L 3/10* | (2006.01) | |
| *B01D 53/26* | (2006.01) | |
| *F25J 1/00* | (2006.01) | |
| *F25J 3/02* | (2006.01) | |
| *B01D 53/02* | (2006.01) | |

(52) U.S. Cl.
CPC .............. *C10L 3/103* (2013.01); *B01D 53/02* (2013.01); *B01D 53/261* (2013.01); *C10L 3/101* (2013.01); *C10L 3/104* (2013.01); *F25J 1/0022* (2013.01); *F25J 3/0214* (2013.01); *F25J 3/0295* (2013.01); *B01D 2253/116* (2013.01); *B01D 2256/24* (2013.01); *B01D 2257/304* (2013.01); *B01D 2257/306* (2013.01); *B01D 2257/504* (2013.01); *B01D 2257/602* (2013.01); *B01D 2257/80* (2013.01)

(58) Field of Classification Search
CPC ...... C10L 3/103; C10L 3/101; C10L 2290/06; C10L 2290/08; C10L 2290/04; C10L 3/12; B01D 53/1475; B01D 53/1412; B01D 53/002; B01D 53/18; B01J 19/245; B01J 2219/00103; B01J 8/00
See application file for complete search history.

(56) References Cited

U.S. PATENT DOCUMENTS

2020/0033054 A1* 1/2020 Jager .................... F25J 1/0274
2021/0113956 A1* 4/2021 Northrop ........... B01D 53/1406

* cited by examiner

*Primary Examiner* — Sharon Pregler
(74) *Attorney, Agent, or Firm* — Plager Schack LLP; Mark H. Plager; Michael J. O'Brien

(57) ABSTRACT

A natural gas processing system is configured to process a two-phase flow in a natural gas transportation system. The natural gas processing system has an off-gas compression package with a compressor suction drum, joined to a stabilizer and to a first stage compressor. A first stage off-gas after cooler is joined to the compressor suction drum and a second stage off-gas suction drum. The second stage off-gas suction drum is operatively coupled to a two-phase separator. A second stage compressor is joined to the second stage off-gas suction drum and a second stage off-gas after cooler. The second stage off-gas after cooler is operatively coupled to an acid gas removal system. The off-gas compression package separates the liquid phase from an off-gas phase.

5 Claims, 2 Drawing Sheets

CONDENSATE STABILIZATION PROCESS

BACKGROUND

The embodiments herein relate generally to natural gas processing.

Production of raw natural gas requires the removal of gas condensate and its treatment to make the stabilized condensate a saleable product. The stabilization of gas condensate requires energy and multiple devices which require capital expenditures as well as operating expenses. In many cases this cost puts a high burden on the treatment cost and condensate price.

Prior to embodiments of the disclosed invention, gas condensate stabilization systems, required a large reboiler at the stabilizer column and an oversized vapor handling system and still struggled to obtain good condensate quality. Embodiments of the disclosed invention solve this problem.

SUMMARY

A natural gas processing system is configured to process a two-phase flow in a natural gas transportation system. The natural gas processing system comprises a slug catcher, operatively connected to the two-phase flow, an acid gas removal system and a feed preheater. A two-phase flow separator is joined to the feed preheater, a cross exchanger, and an off-gas compression package. A stabilizer is joined to the cross exchanger, a reboiler, and the off-gas compression package. The off-gas compression package further comprises a compressor suction drum, joined to the stabilizer and to a first stage compressor. A first stage off-gas after cooler is joined to the compressor suction drum and a second stage off-gas suction drum. The second stage off-gas suction drum is operatively coupled to the two-phase separator. A second stage compressor is joined to the second stage off-gas suction drum and a second stage off-gas after cooler. The second stage off-gas after cooler is operatively coupled to an acid gas removal system. The off-gas compression separates the liquid phase from an off-gas phase.

The acid gas removal system further comprises a mol sieve dehydration stage operatively coupled to an acid gas removal stage and a mercury removal stage. The acid gas removal stage removes hydrogen sulfide, carbon dioxide and mercaptans from the off-gas phase. The mol sieve dehydration stage removes water from the off-gas phase.

The acid gas removal system further comprises a mercury removal stage, operatively connected to the mol sieve dehydration stage and a C2+ recovery stage. The mercury removal stage removes mercury from the off gas.

The acid gas removal system further comprises a C2/C3 separation stage, operatively coupled to the C2+ recovery stage and a C3/C4 separation stage; wherein the C2/C3 separation stage removes ethane from the off gas and the C3/C4 separation stage removes propane from the off gas.

The acid gas removal system further comprises a C4/C5 separation stage, operatively coupled to the C3/C4 separation stage and the storage tank. The C4/C5 separation stage removes butane from the off-gas resulting in a condensate that is transferred to the storage tank.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

A pipeline that transports both gas and liquids together, known as two-phase flow, can operate in a flow regime known as slugging flow or slug flow. Under the influence of gravity, liquids will tend to settle on the bottom of the pipeline, while the gases occupy the top section of the pipeline. Under certain operating conditions gas and liquid are not evenly distributed throughout the pipeline, but travel as large "slugs" with mostly liquids or mostly gases through the pipeline.

Figure 1:
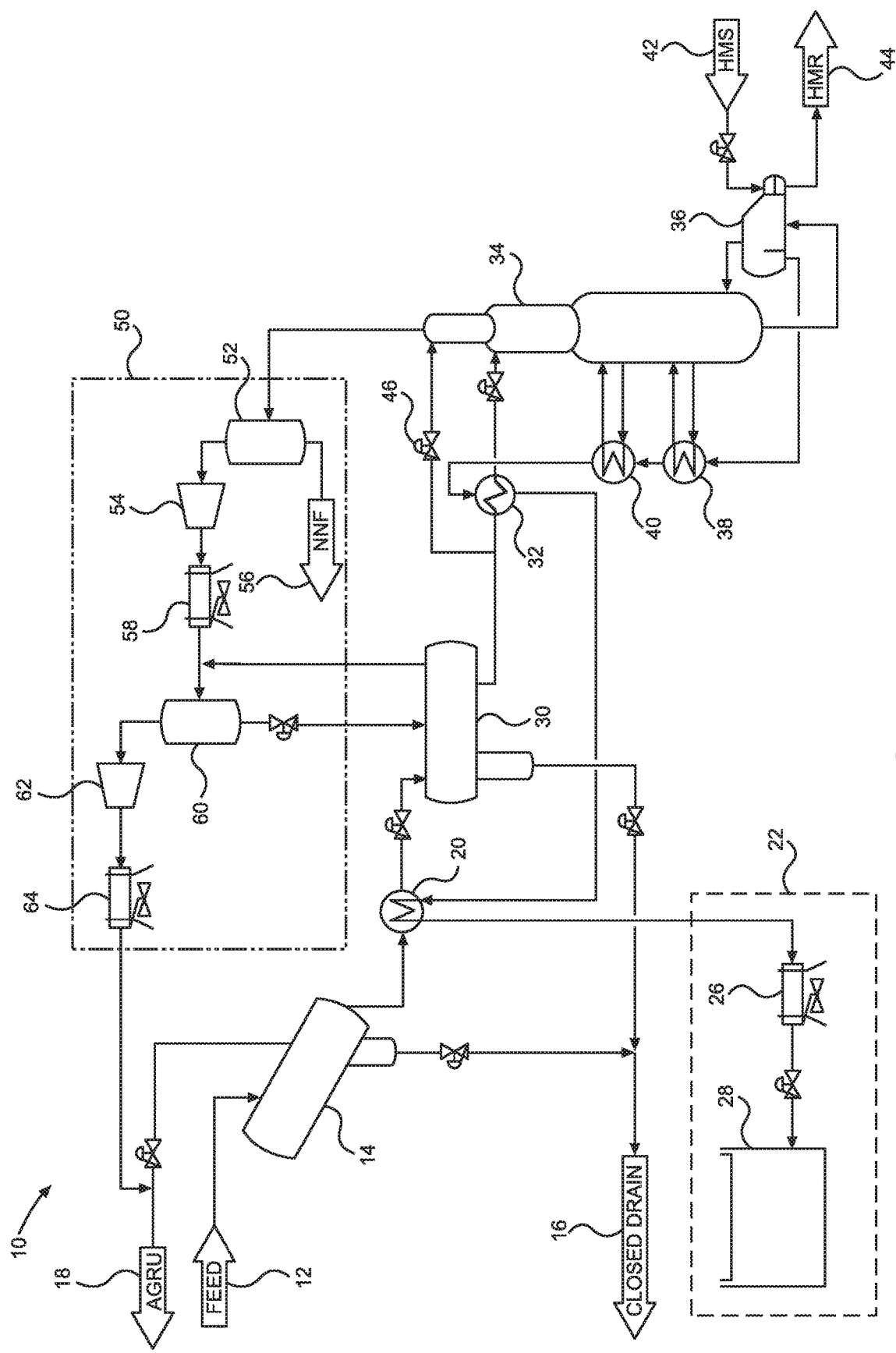
FIG. 1 shows a schematic view of one embodiment of the present invention.

By way of example, and referring to FIG. 1, one embodiment of a gas condensate stabilization system 10 further comprises a two-phase flow feed 12 mechanically coupled to a slug catcher 14. The slug catcher 14 is operatively connected to a closed drain 16, to an acid gas removal unit 18, and to a feed preheater 20. The feed preheater 20 is operatively coupled to a condensate stabilization system 22 and a two-phase flow separator 30.

The condensate stabilization system 22 further comprises a condensate cooler 26 joined to a storage tank 28. The two-phase flow separator 30 is operatively coupled to the closed drain 16, a cross exchanger 32 and an off-gas compression package 50. Two-phase flow separator 30 drains most of the water from the bottom of the two-phase flow separator 30 using the closed drain 16. The liquid and a small amount of the water enter the cross exchanger 32. The gas present goes into the off-gas compression package 50.

The cross exchanger 32 is operatively coupled to a stabilizer 34, and the feed preheater 20. The stabilizer 34 is operatively coupled to a reboiler 36, a first side reboiler 38 and a second side reboiler 40. The reboiler 36, the first side reboiler 38 and the second side reboiler 40 are each coupled to at least one heat exchanger having a heat medium supply 42 and a heat medium return 44. In some embodiments, a cross exchanger bypass 46 can be opened, bypassing the cross exchanger 32 and allowing the liquid and gas to flow directly into the stabilizer 34. The stabilizer 34 operates to shift the liquid material into gas which then flows into the off-gas compression package 50.

The off-gas compression package 50 further comprises a compressor suction drum 52 that is operatively coupled to a first stage compressor 54 and a no normal flow drain 56. The first stage compressor 54 is operatively coupled to a first stage off-gas cooler 58. The first stage off-gas cooler 58 and the two-phase flow separator 30 are operatively connected to the second stage off-gas compression drum 60. The second stage off-gas compression drum 60 drains liquid into the two-phase flow separator 30 and provides gas to the second stage compressor 62. A second stage off gas after cooler 64 is operatively coupled to the second stage compressor 62 and the acid gas removal unit 18.

Figure 2:
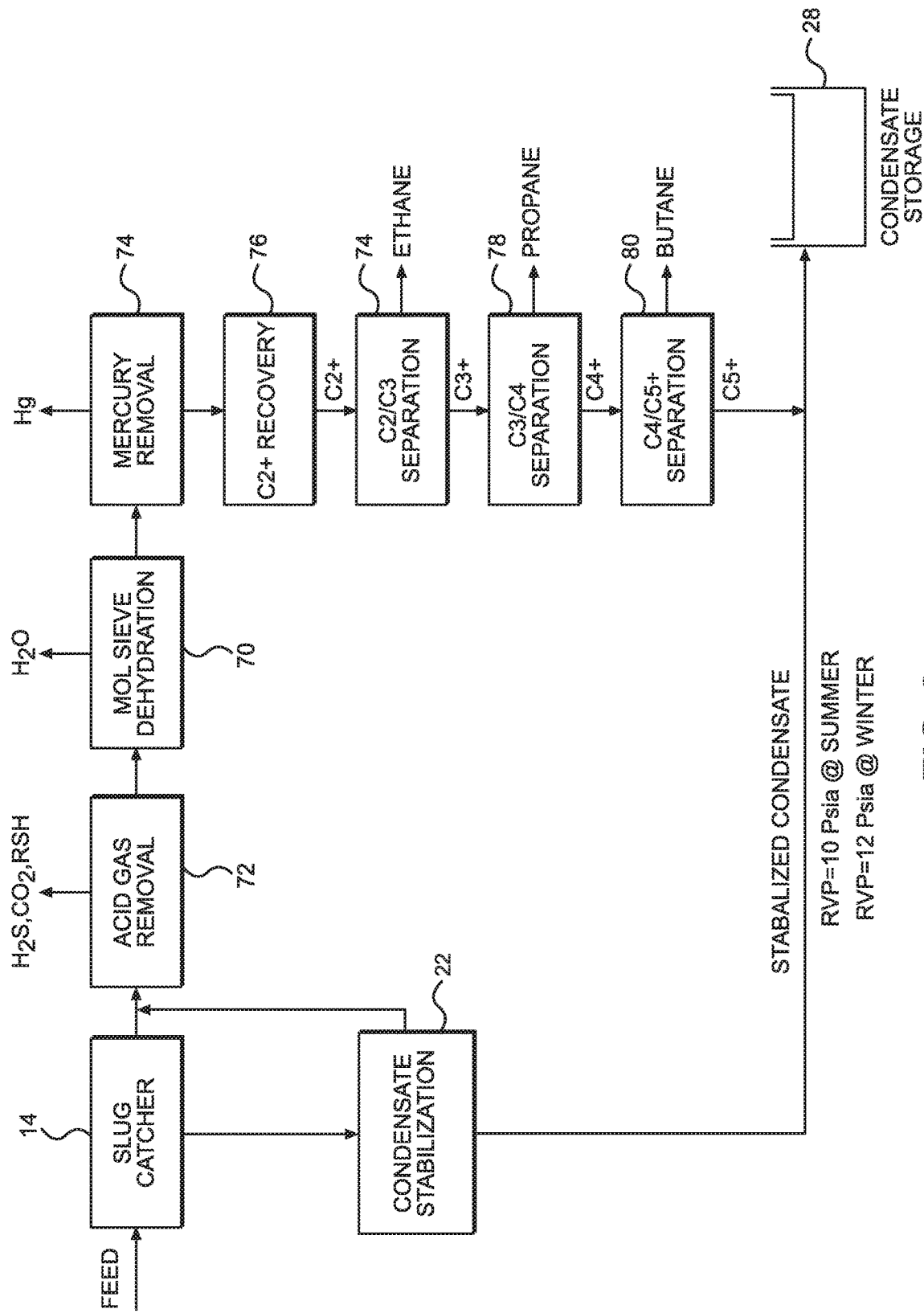
FIG. 2 shows a flow chart of one embodiment of the present invention.

Turning to FIG. 2, the slug catcher 14 is operatively coupled to the condensate stabilization system 22 and the acid gas removal unit (AGRU) 18. The acid gas removal unit 18 further comprises a mol sieve dehydration stage 70 operatively coupled to an acid gas removal stage 72 and a mercury removal stage 74. A C2/C3 separation stage 74 is operatively coupled to a C2+ recovery stage 76 and a C3/C4 separation stage 78. A C4/C5 separation stage 80 is operatively coupled to the C3/C4 separation stage 78 and the storage tank 28.

The acid gas removal stage 72 removes hydrogen sulfide, carbon dioxide and mercaptans. The mol sieve dehydration stage 70 removes water. The mercury removal stage 74 removes mercury. The C2+ recovery stage 76 recovers natural gas liquid. The C2/C3 separation stage 74 removes ethane. The C3/C4 separation stage 78 removes propane. The C4/C5 separation stage 80 removes butane resulting in a condensate that is transferred to the storage tank 28.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, 116. In particular, any use of "step of" in the claims is not intended to invoke the provision of 35 U.S.C. § 112, 116.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A natural gas processing system configured to process a two-phase flow in a natural gas transportation system; the natural gas processing system comprising:
   a slug catcher, operatively connected to the two-phase flow, an acid gas removal system and a feed preheater,
   a two-phase separator, joined to the feed preheater, a cross exchanger, and an off-gas compression package;
   a stabilizer, joined to the cross exchanger, a reboiler, and the off-gas compression package;
   wherein the off-gas compression package further comprises:
      a compressor suction drum, joined to the stabilizer and to a first stage compressor;
      a first stage off-gas after cooler, joined to the compressor suction drum and a second stage off-gas suction drum; wherein the second stage off-gas suction drum is operatively coupled to the two-phase separator; and
      a second stage compressor, joined to the second stage off-gas suction drum and a second stage off-gas after cooler; wherein the second stage off-gas after cooler is operatively coupled to an acid gas removal system;
   wherein the off-gas compression separates the liquid phase from an off-gas phase.

2. The natural gas processing system of claim 1, wherein the acid gas removal system further comprises: a mol sieve dehydration stage operatively coupled to an acid gas removal stage and a mercury removal stage; wherein the acid gas removal stage removes hydrogen sulfide, carbon dioxide and mercaptans from the off-gas phase; wherein the mol sieve dehydration stage removes water from the off-gas phase.

3. The natural gas processing system of claim 2, wherein the acid gas removal system further comprises a mercury removal stage, operatively connected to the mol sieve dehydration stage and a C2+ recovery stage; wherein the mercury removal stage removes mercury from the off gas.

4. The natural gas processing system of claim 3, wherein the acid gas removal system further comprises a C2/C3 separation stage, operatively coupled to the C2+ recovery stage and a C3/C4 separation stage; wherein the C2/C3 separation stage removes ethane from the off gas and the C3/C4 separation stage removes propane from the off gas.

5. The natural gas processing system of claim 4, wherein the acid gas removal system further comprises a C4/C5 separation stage, operatively coupled to the C3/C4 separation stage and the storage tank; wherein the C4/C5 separation stage removes butane from the off-gas resulting in a condensate that is transferred to the storage tank.

* * * * *